(12) United States Patent
Buerger et al.

(10) Patent No.: US 7,670,720 B1
(45) Date of Patent: Mar. 2, 2010

(54) ELECTROCHEMICAL ENERGY STORAGE MEANS

(75) Inventors: Wolfgang Buerger, Hockessin (DE); Peter Hertel, Putzbrunn (DE); Manfred Wendl, Rosenheim (DE)

(73) Assignee: W. L. Gore & Associates GmbH, Putzbrunn (DE)

( * ) Notice: Subject to any disclaimer, the term of this patent is extended or adjusted under 35 U.S.C. 154(b) by 0 days.

(21) Appl. No.: 09/509,232

(22) PCT Filed: Sep. 22, 1998

(86) PCT No.: PCT/EP98/06032

§ 371 (c)(1), (2), (4) Date: Nov. 6, 2000

(87) PCT Pub. No.: WO99/16138

PCT Pub. Date: Apr. 1, 1999

(30) Foreign Application Priority Data

Sep. 22, 1997 (DE) ................................ 197 41 736

(51) Int. Cl.
*H01M 8/04* (2006.01)

(52) U.S. Cl. .................... 429/188; 429/30; 429/304; 429/316; 429/300

(58) Field of Classification Search .................. 429/30, 429/33, 41, 46, 40, 44, 188, 304
See application file for complete search history.

(56) References Cited

U.S. PATENT DOCUMENTS

| | | | |
|---|---|---|---|
| 5,302,269 A | * | 4/1994 | Eisman et al. .............. 204/252 |
| 5,795,668 A | | 8/1998 | Banerjee |
| 5,814,405 A | * | 9/1998 | Branca et al. .......... 428/311.51 |
| 6,613,203 B1 | * | 9/2003 | Hobson et al. .............. 204/296 |

FOREIGN PATENT DOCUMENTS

| | | | | |
|---|---|---|---|---|
| EP | 0 718 903 | | 6/1996 | |
| EP | 0718903 | A1 * | 6/1996 | |
| EP | EP 0718903 | * | 6/1996 | ................. 429/30 |
| JP | 04 204522 | | 7/1992 | |
| JP | 6 161249 | | 5/1994 | |
| JP | 342666 | | 12/1994 | |
| JP | 8-316105 | | 11/1995 | |
| JP | 8-250377 | | 9/1996 | |
| WO | WO 98/11614 | | 3/1998 | |

* cited by examiner

*Primary Examiner*—Patrick Ryan
*Assistant Examiner*—Ben Lewis
(74) *Attorney, Agent, or Firm*—Allan M. Wheatcraft

(57) ABSTRACT

A solid polymer electrolyte composite for an electrochemical reaction apparatus that possesses satisfactory ion conduction properties and has excellent mechanical strength and heat resistance, is provided. The solid polymer electrolyte composite is characterized in that a solid polymer electrolyte is contained in the continuous pores of an expanded porous polytetrafluoroethylene sheet which has continuous pores and in which the inner surfaces defining the pores are covered with a functional material such as a metal oxide. An electrochemical reaction apparatus containing an electrolyte, wherein said electrochemical reaction apparatus is characterized in that the aforementioned solid polymer electrolyte composite is used as this electrolyte is also provided.

1 Claim, 2 Drawing Sheets

ELECTROCHEMICAL ENERGY STORAGE MEANS

Figure 1:
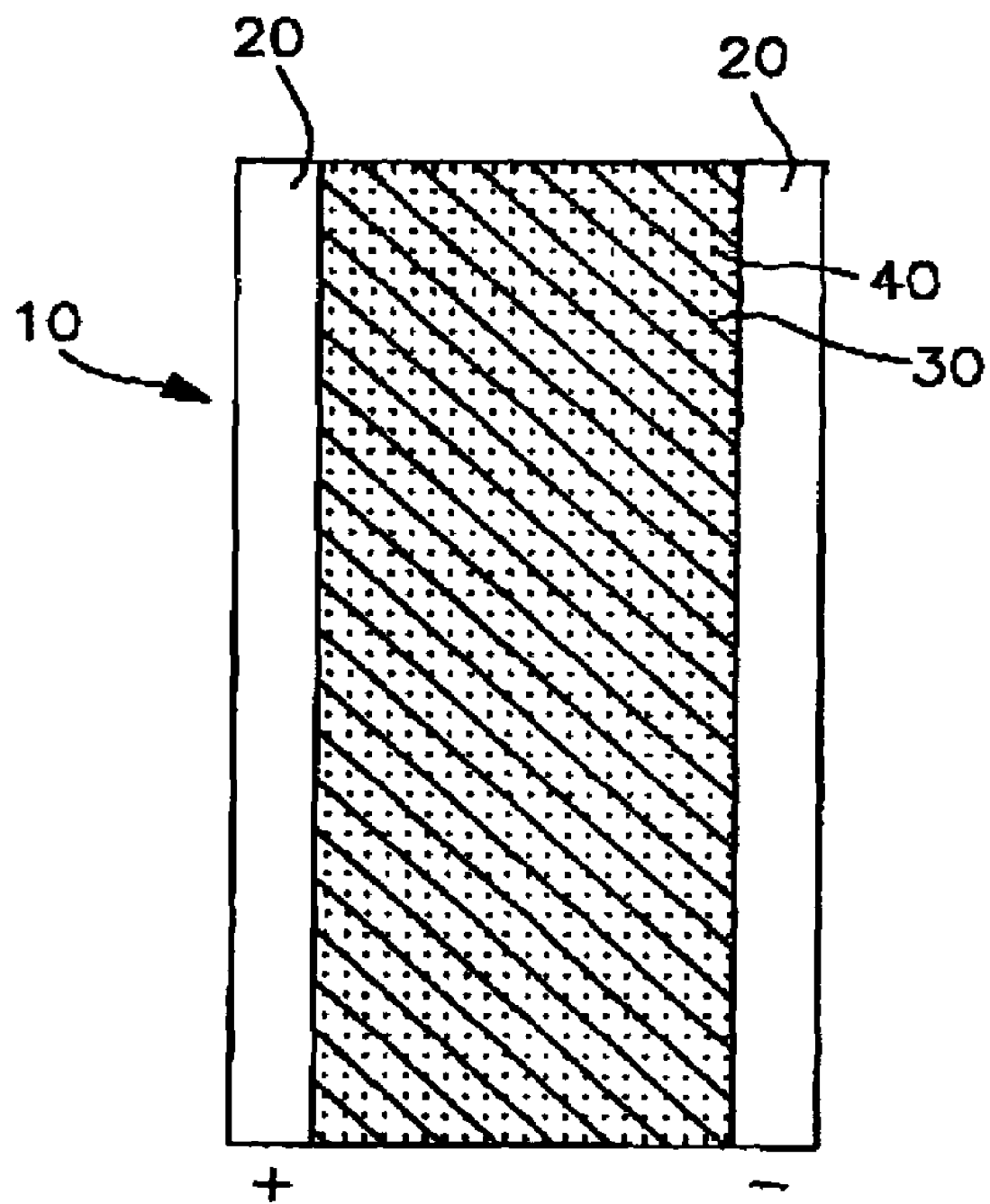

This invention relates to an electrochemical energy storage means.

Electrochemical energy storage means in the sense of the invention are in particular capacitors, accumulators and batteries.

The present invention is based on the problem of providing a storage means which has a high capacity despite a low space requirement, is simple and cost-effective in production, reliable in handling and characterized by long life.

The invention is based on the finding that this problem can be solved by an energy storage means wherein the carrier material for an electrolyte used is a porous material modified with a substance which influences both the surface properties of the porous material and the surface tension and ionic conductivity of the electrolyte.

The subject matter of the present invention is an electrochemical energy storage means with at least two electrodes and an electrolyte, a carrier material for an electrolyte being disposed between the electrodes, and the carrier material including a porous material in whose inner pore structure a perfluorinated surface-active substance is present.

Porous material in the sense of this invention refers to material having cavities in its structure which permit mass transfer. The cavities can be produced as pores or by the fibrous structure of the material.

The carrier material in the storage means is to hold the electrolyte and simultaneously allow ion flow in the electrolyte between the electrodes. This can be ensured, firstly, by the carrier material being a porous material and, secondly, by providing a perfluorinated surface-active substance which is present in the inner pore structure of the material. The perfluorinated surface substance is suitable both for improving the surface properties of the material and for influencing the properties of the electrolyte. The porous material can thus be wetted by the electrolyte and receive and hold it reliably. This ensures excellent electrolytic transport and outstanding mobility. This transport and mobility is of considerable importance for the ion flow in the electrolyte. The perfluorinated surface-active substance additionally increases the ion mobility in the electrolyte. Consequently the inventive storage means has an outstanding capacity.

The porous material is preferably a porous fluoropolymer. Use of a porous fluoropolymer involves the advantage of providing a material with high chemical and thermal stability. Temperature resistance must be ensured since high temperatures can be present in the energy storage means e.g. upon charging and discharging at high current densities and melting of the carrier material must be avoided. The carrier material is additionally exposed to the electrolyte and/or redox systems in the storage means. The electrolyte is normally a chemically active substance, e.g. a strong acid or base. The carrier material must therefore have sufficient chemical stability.

The presence of a perfluorinated surface-active substance in the inner pore structure of the porous fluoropolymer makes the latter wettable and receptive for the electrolyte. This wettability ensures a sufficient hold of the electrolyte in the carrier material, in particular in the pores. A sufficient presence of electrolyte in the pores permits the ions to penetrate through the electrolyte-filled pores of the carrier material and thus high ion flow and high ion mobility, leading to low ohmic resistance of the storage means. Chemical and thermal stability of the modified porous material and stable adhesion of the substance to the porous material ensure a long life of the inventive storage means.

In a preferred embodiment the inner pore structure of the porous material is coated at least partly with the perfluorinated surface-active substances. Since the presence of the surface-active substance is realized in the form of a layer, excellent ion flow can be maintained in the electrolyte by the pore structure, as compared to the pores being filled with perfluorinated surface-active substance. In addition, providing a layer on the inner surface of the pore structure does not reduce the receiving capacity of the carrier material for an electrolyte.

The perfluorinated surface-active substance preferably has at least four carbon atoms.

The perfluorinated surface-active substance can be perfluorinated carboxylic acid, perfluorinated sulfonic acid, salts of said acids or perfluorinated betaine. These substances are characterized in that they can cause reduced surface tension of the electrolyte even at low concentration and additionally have high chemical and thermal stability. The electrolyte or redox system is normally present in an aqueous solution. To ensure adequate reception in the pore structure and sufficient transport and mobility through the pore structure a hydrophilic surface is therefore necessary. Use of the above-mentioned fluorosurfactants achieves outstanding hydrophiling of the carrier material. Furthermore these substances have a certain solubility in the electrolyte, which is of advantage for reducing the surface tension of the electrolyte.

The porous material used in the inventive energy storage means is preferably polytetrafluoroethylene (PTFE). This material has excellent chemical and thermal stability and can be produced with high porosity. This permits the thickness of the carrier material in the inventive electrochemical energy storage means to be kept low and thus the gap between the electrodes to be reduced. A small gap between the electrodes is desirable in particular with capacitors since this increases the energy density of the capacitor. At the same time, however, the carrier material must permit reception of a sufficient quantity of electrolyte even at low thickness in order to allow good ion flow and ion mobility in the electrolyte between the electrodes. This can be ideally using PTFE by reason of the high porosity with which a PTFE layer can be produced. Additionally the use of PTFE allows production of a carrier material layer with very constant small thickness and uniform structure. Due to these properties the PTFE carrier material can also serve as a reliable spacer between the electrodes. Furthermore a uniform ion flow through the pore structure is ensured, and disturbances due to irregularities in the carrier material excluded. The use of PTFE as a porous fluoropolymer also ensures high flexibility, which is of advantage in particular in the production of the inventive energy storage means since it avoids damage to the carrier material due to breakage. One can further use PTFE copolymers or blends of PTFE homopolymers as the porous material.

According to a further embodiment the carrier material can be a composite containing nano-scale ceramic. The presence of this, e.g. ion-conductive, ceramic makes the carrier material take part in the ion flow in the electrolyte. This increases the total ionic conductivity and improves the efficacy of the energy storage means at a given porosity. The nano-scale ceramic is preferably present in a quantity of no more than 50 vol % based on the fluoropolymer. In these quantities the properties otherwise typical of ceramic, in particular the brittleness, do not yet take effect and adversely affect the properties of the carrier material.

The porous material used can further be fluoropolymers, in particular PTFE copolymers or blends as composites with thermoplastics. These thermoplastics are present in a quantity of 20 to 90 wt %, preferably 30 to 70 wt %, based on the fluoropolymer.

According to the invention the porous material has a porosity of more than 50%, preferably more than 60%, especially preferably more than 70%. Such high porosity of the porous material allows good penetration of the carrier material with the electrolyte and thus a high electrolyte content in the space between the electrodes. Furthermore, high porosity minimizes the volume fraction between the electrodes which is filled by the porous material and does not take part in ion flow. The high porosity of the material also has a positive effect on the active surface of the electrodes or the energy density and capacity of the energy storage means. With high porosity the contact surface between the carrier material and the electrode or the redox system is minimal so that the surface of the electrodes available for the storage process is not reduced unnecessarily.

In a further preferred embodiment the perfluorinated surface-active substance is present partly in the electrolyte. Use of a surface-active substance having sufficient solubility in the electrolyte not only promotes hydrophiling of the surface of the carrier material but additionally reduces surface tension in the electrolyte. This reduced surface tension contributes considerably to sufficient wetting of the carrier material and electrode. Additionally the presence of perfluorinated surface-active substance in the electrolyte improves the ionic conductivity of the electrolyte.

The electrochemical energy storage means according to the present invention is preferably a capacitor. Ionic conductivity of the electrolyte and good wetting of the electrodes are very important in particular with capacitors. The advantages of the invention are therefore optimally exploited in a capacitor, in particular an electrolytic capacitor.

If the inventive electrochemical energy storage means is a capacitor, it consists of electrodes and a carrier material penetrated by the electrolyte. When voltage is applied to the electrodes an ion flow is caused in the electrolyte. The capacitance of such a capacitor is dependent on the active surface of the electrodes and inversely proportional to the thickness of the electrochemical double layer, comprising the ionic electrolyte components in the carrier material, formed on the contact surface between electrolyte and electrode.

The active surface of the electrodes is determined by the contact surface between electrode and electrolyte. To increase the specific surface area, the electrode can have a certain roughness or porosity which can extend into the nanometer range. The thus enlarged surface is to enter into contact with the electrolyte as far as possible. Dead places, e.g. due to air pockets or due to the contact of the carrier material with the electrode, are thus to be kept as small as possible. In the inventive energy storage means, the surface to be activated is optimized by using a porous material with high porosity and a surface modified by a perfluorinated surface-active substance as a carrier material. The high porosity minimizes the contact surface between the carrier material and the electrodes, and the reduced surface tension of the electrolyte ensures sufficient wetting of the electrode. The available surface can thus be optimally exploited.

The gap to be adjusted between the electrodes can also be optimized in the inventive energy storage means. The use of a porous material, in particular fluoropolymer, coated with a perfluorinated surface-active substance permits production of thin layers having a constant thickness and uniform structure. This reliably avoids contact between the electrodes even with a thin layer of carrier material. Due to the high porosity and in particular the hydrophiling of the carrier material surface caused by the surface-active substance, a sufficient quantity of electrolyte can be received in the carrier material and undisturbed ion flow ensured even at a small thickness of the carrier material.

The perfluorinated surface-active substance furthermore does not reduce the ionic conductivity of the electrolyte.

The capacitance of such an inventive capacitor can thus assume high values.

The carrier material, fluoropolymer, preferably used in the invention has the additional advantage of being temperature-resistant, thereby avoiding undesirable melting of the carrier material. An inventive capacitor also offers advantages in the choice of electrolyte to be used. The surface modified porous fluoropolymer has outstanding chemical stability, and undesirable decomposition processes of the carrier material can be reliably avoided even in the presence of strong electrolytes.

The use of a porous fluoropolymer which has been treated with a perfluorinated surface-active substance thus has the following advantages for a capacitor:
- the carrier material serves as a reliable spacer between the electrodes;
- electrolytic flow is optimized due to the high porosity and good wettability of the carrier material;
- the perfluorinated surface-active substance positively influences the ion flow and ion mobility in the electrolyte; and
- the carrier material has outstanding temperature resistance and chemical stability.

The enclosed FIG. 1 shows schematically the structure of a possible embodiment of a capacitor according to the present invention and will be described in the following.

Storage means 10 has two electrodes 20, e.g. of titanium, which can be subjected to voltage by connections not shown in the figure. Between the electrodes there is carrier element 30, e.g. expanded porous PTFE, coated with a perfluorinated carboxylic acid, which is penetrated by electrolyte 40, e.g., sulfuric acid, and holds it in its pores.

In use, the porous fluoropolymer of this invention which has been treated with a perfluorinated surface-active substance is typically compressed by single or double side embossed or structured current collector plates. One or more of the treated porous fluoropolymer materials of this invention may be compressed between the plates. The inventors have discovered that the carrier materials of this invention have unexpectedly very good sealing properties around the periphery of the carrier materials between the plates. In tests using isopropanol, a highly wetting fluid, the carrier material of this invention, which had been hydrophilized by the perfluorinated surface-active substance, provided a strong enough seal to prevent leakage of the isopropanol at reasonable sealing stresses.

This invention thus provides an integrated seal in a separator. The sealing separator may have the same construction as that set forth above. This has high value in any bipolar or single stack design, such as supercapacitors and fuel cells. Using the separator as a sealant eliminates additional sealing materials and the necessity of handling such additional sealing materials.

In an alternative embodiment of the present invention, a peripheral portion of the carrier material is not internally coated in its pores with the perfluorinated surface-active substance. Only the center portion of the carrier material that is exposed to the electrolyte is so coated. The non-coated periphery is the portion that is compressed and used to perform the sealing function.

In a further alternative embodiment taking advantage of the sealing properties of the carrier material of this invention, the peripheral area may be coated, partially or fully within the pores, with a thermoplastic, preferably an elastomer, and more preferably a fluoroelastomer or perfluoroelastomer. The center area of the carrier material of this embodiment is coated with the perfluorinated surface-active substance and the sealing periphery is coated with the thermoplastic in order to form the seal upon compression and use.

Figure 2:
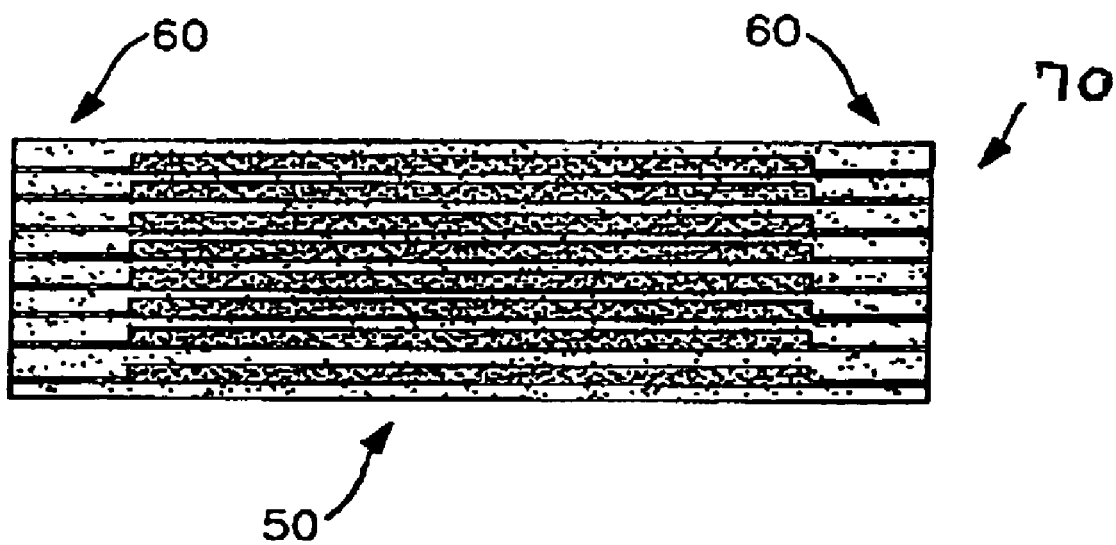

The attached FIG. 2 further illustrates this aspect of the invention. A stack 70 of carrier materials according to this invention is shown in FIG. 2. The center portion 50 of each of the materials is internally coated with the perfluorinated surface-active substance as described above. The peripheral portion 60 of the carrier material is either uncoated, or internally imbibed, partially or fully, with a thermoplastic. Peripheral portion 60 is the area of the carrier material that is compressed during use and performs the sealing function.

The porous material used in the inventive storage means preferably has the following characteristics. It should be electrically nonconductive and resistant to electrolyte and temperature. This resistance ensures long-term use of the storage means. Furthermore it should allow production of a thin flexible layer with a high porosity.

Porous materials to be used are e.g. fluoropolymers, polyethylenes, polypropylenes, glass fibers or zirconium dioxides.

The formation of the porous structure is not limited to any certain technology. Pore-forming methods can include stretching, extracting a second component, dissolving out a component, applying the nuclear trace technique and pore formation by bubble formation. U.S. Pat. No. 3,953,566 describes e.g. the production of expanded porous PTFE (ePTFE).

The porosity of the porous material used according to the invention is calculated by the following equation:

Porosity=$(1-\rho_m/\rho_t)\times 100\%$ where $\rho_m$ is the measured density of the material and $\rho_t$ the theoretical density thereof.

Porous fluoropolymers which can be used in an inventive energy storage means are e.g. PTFE and PTFE copolymers. The PTFE can e.g. also be a type of PTFE with comonomers, referred to as "modified PTFE" (described in more detail below). This designation also covers polymers in which the homopolymer is modified by copolymerization with ethylically unsaturated comonomers, their share being <2 mass percent based on the copolymer. Examples of such comonomers are: ethylene, propylene, halogenated olefins such as hexafluoropropene, vinylidene fluorides and chlorotrifluoroethylene; cyclic fluorinated monomers or perfluoroalkylvinylethers such as perfluoropropylvinylethers, perfluoromethylvinylethers or perfluorovinylethers with terminal carboxyl or sulfonic acid groups.

If the share of copolymer is more than 2 mass percent, the porous fluoropolymers are called fluorothermoplastics, fluoroionomers or fluoroelastomers.

The starting material can also consist of fluorohomopolymers. Fluorohomopolymers can be present as blends with low-molecular PTFE. The fluorohomopolymers are likewise mixable with tetrafluoroethylene (TFE) copolymers processed from the melt, such as hexafluoropropylene/tetrafluoroethylene copolymers (FEP), perfluoroalkylvinyl/tetrafluoroethylene copolymers (PFA) or perfluorodioxole copolymers, e.g. available under the brand name Teflon AF from Dupont.

The porous material produced according to the U.S. Pat. No. 3,953,566 patent produces ePTFE films which have good air flow, are strong, handleable and uniform. This is accomplished, as described in U.S. Pat. No. 3,953,566, by first compounding a polytetrafluoroethylene (PTFE) resin which is suited to produce a node and fibril microstructure upon stretching. The resin is blended with an aliphatic hydrocarbon lubricant extrusion aid, such as a mineral spirit. The compounded resin is formed into a cylindrical pellet and paste extruded by known procedure into a desired extrudable shape, preferably a tape or membrane. The article can be calendered to the desired thickness between rolls and then thermally dried to remove the lubricant. The dried article is expanded in a first stretch in the machine and/or transverse direction to produce an ePTFE structure characterized by a series of nodes which are interconnected by fibrils. The ePTFE article is then amorphously locked by heating the article above the crystalline melt point of PTFE (343° C.), for example, 343-375° C. As described in U.S. Pat. No. 5,814,405, the amorphously locked article may be then further stretched at a temperature above the crystalline melt point in at least the direction orthogonal to the direction of greatest expansion in the first stretch.

The resulting ePTFE materials are extremely uniform and possess a unique microstructure characterized as having highly elongated nodes interconnected by fibrils. The resulting porous materials also have a unique set of physical properties including high strength and low resistance to fluid flow, as well as a wide range of physical properties. It is quite surprising that this type of process would produce a highly uniform continuous film, especially with the large node, i.e., coarse, microstructures which are possible. Melt stretched membranes also have higher compression resistance.

A most preferred porous material allows the creation of open pore materials with low resistance to fluid flow by combining two types of stretching techniques, one before and one after amorphous locking. Initial expansion in the longitudinal direction is carried out prior to amorphous locking to set the scale of the microstructure (i.e., fibril and node dimensions). The uniformity of this expanded material is extremely high. This highly uniform microstructure is then amorphously locked by heating above the crystalline melting point of the highest melting PTFE present. This coalesces the nodes into sections of solid polymer. This locking step helps to preserve the uniformity of that initial expansion step. In the final transverse stretching step, when the expanded material is heated to a temperature above the crystalline melt point of the PTFE resins present, the nodes elongate while the fibrils separate. The nodes do not continue to fracture and fibrillate upon further stretching as occurs in expansions with non-amorphously locked PTFE tapes. Because no additional fibrillation takes place in this stretch step, very open, high flow, high strength membranes with extremely high specific inner surface area can be produced.

Traditional biaxial expansions of non-amorphously locked PTFE are extremely sensitive to differences in temperature and rate. Small differences in temperature or rate can lead to nonuniformities in the final membrane. Surprisingly, the stretch above the crystalline melt point described above is much less sensitive to changes in temperature or rate. As a result, the membranes produced are much more uniform than traditional expanded PTFE products. The nodes of this structure are necessarily highly elongated and oriented. Aspect ratios on these nodes are greater than about 25 or 50:1 and preferably greater than 150:1. This effectively produces a structure with solid polymer reinforced nodular ribs oriented transverse to the direction of initial expansion. These ribs prevent propagation of breaks or tears in the longitudinal direction. Such porous material provides extremely coarse microstructures where a large percentage of the total mass is retained in the nodes. This results in a much higher mass article for a given openness or air flow thus yielding higher strength and durability. Matrix tensile strength can also be increased by increasing stretch ratio. By balancing the first and second stretch steps, a balance in strength in the x and y direction can be obtained.

The high strength of this preferred porous material allows the material to be compressed between collector plates in use without significantly closing the pores of the material. This is a significant advantage over the prior art. The more open structure of this porous material also allows more space for the perfluorinated surface-active agent and, more importantly, the electrolyte. This further improves ion mobility using this invention.

The PTFE starting material for this preferred porous material can be any type of coagulated dispersion PTFE which lends itself to the formation of fibrils and nodes upon expansion. This is generally a polymer of high molecular weight.

A preferred starting material which produces uniform, strong, easily handled materials is a blend of high molecular weight fine powder PTFE homopolymer and a lower molecular weight modified PTFE polymer. This material is readily processed to form uniform expanded products with large nodes and long fibrils. By combining this blend of two PTFE resins with the process described above, a family of high flow, strong, uniform, handleable materials can be produced that are surprisingly useful for this invention.

Thus, the PTFE starting material used in the preferred process of making the porous material of the invention can be homopolymer PTFE or a blend of PTFE homopolymers. It can also be a blend of homopolymer and a PTFE copolymer in which the comonomer units are not present in amounts which cause the polymer to lose the non-melt-processible characteristics of pure homopolymer PTFE. By "fine powder PTFE" is meant that PTFE prepared by the "aqueous dispersion" polymerization technique. Both terms are well-known terms in the PTFE art.

The copolymers are called "modified PTFE homopolymers" in the art.

The term "modified PTFE" is used here to describe a non-melt-processible polymer which is not a PTFE homopolymer but is a copolymer in which the homopolymer has been modified by copolymerisation with a copolymerisable ethylenically unsaturated comonomer in a small amount of less than 2% preferably less than 1%, by weight of copolymer. These copolymers have been called "modified" PTFE by those skilled in the art because presence of comonomer units does not change the basic nonmelt processable character of homopolymer PTFE. Thus, the term "modified" is used to connote that the good toughness, heat resistance and high temperature stability of the homopolymer is not altered when the homopolymer chain is interrupted by smaller trace units of the comonomer. Examples of comonomers include olefins such as ethylene and propylene; halogenated olefins such as hexafluoropropylene (HFP), vinylidene fluoride and chlorofluoroethylene; or perfluoroalkyl vinyl ethers such as perfluororpropyl vinyl ether (PPVE) and perfluoromethyl vinyl ether (PMVE). Preferably the comonomer is fluorinated and most preferably is HFP, PPVE, or PMVE. Neither PTFE homopolymer nor modified PTFE is considered to be elastomeric.

The homopolymer can also be blended with low molecular weight PTFE known as micropowders, which are made by irradiation of high molecular weight PTFE, or are made by special TFE polymerization. The homopolymer can also be blended with melt-processibie TFE copolymers such as FEP or PFA (hexafluoropropylene/tetrafluoroethylene copolymers or perfluoroalkyl vinyl ether/tetrafluoroethylene copolymer). Blends of two or more PTFE polymers can be used, as can blends of PTFE with other fluoropolymers. No particular preference is made over the ratios of ingredients of these blends. One ingredient can be 5% or 95%, by either weight or volume.

In another embodiment even greater openness of structure can be achieved without sacrificing uniformity or handleability by carrying out an additional longitudinal stretch after amorphous locking but prior to the final transverse stretch. The first post amorphous locking stretch in the longitudinal direction does little to further break up nodes but does elongate existing fibrils and separate existing nodes. By adding this stretching step nodes are separated and fibrils lengthened. The structure thus created has a significantly larger average effective pore size. This added step does not reduce the overall uniformity of the final material. Adding this step greatly increases the total post amorphous locking stretch ratio possible with a given precursor. Typical constructions can be stretched to ratios between 9:1 and 12:1 in the transverse direction above 327° C. With the post locking longitudinal stretch, total stretch ratios after amorphous locking of 24:1 and greater can be achieved. With a given precursor, Frazier number values have been increased by a factor of 25 while ball burst values decreased by a factor of only 3 when a 4:1 longitudinal stretch after amorphous locking was added.

In another alternative embodiment, porous fluoropolymers which can furthermore be used are polymers additionally having nano-scale ceramic. This is preferably added to the polymer in powder form to the lubricant or as water based dispersion to PTFE dispersion.

Nano-scale ceramic powders in the sense of the invention include the group of metal oxides such as aluminum oxide, zirconium dioxide, silicon dioxide, titanium dioxide, zinc oxide and iron oxide as well as metal oxides with coatings (oxides, organic substances), mixed oxides, ferrites, metallic salts such as sulfates, sulfites, sulfides and phosphates. Naturally occurring materials, such as clays, kaolins, etc., can also be used. The particle size of the nano-scale ceramic powders is preferably 2 to 300 nm.

The porous fluoropolymer is preferably present in the form of a melt-stretched membrane, as discussed above. The microstructure of the porous fluoropolymer can consist of nodes and fibrils, only of fibrils, of fibril strands or bundles of fibrils or else of stretched nodes interconnected by fibrils. The preferred pore size of the fluoropolymer is in the range of 0.01 to 15 microns.

The thickness of the porous fluoropolymer membrane is preferably between 1 to 1000 microns.

It is also within the scope of the invention to give the porous carrier material a multilayer design. One can use a sandwich of a porous fluoropolymer membrane with an ionconductive membrane of a system comprising a porous fluoropolymer membrane, a conventional ion-conductive membrane and a further porous fluoropolymer membrane. The conventional ion-conductive membrane can be e.g. a filled plastic membrane, the membrane being filled e.g. with perfluorinated ionomers, e.g. from a copolymer of tetrafluoroethylene and perfiuorovinylether with terminal sulfonic acid groups, or e.g. with doped $ZrO_2$. The use of such a system or sandwich additionally improves the ion flow in such a conventional membrane between the electrodes. Symmetrical or asymmetrical membranes can be used.

The perfluorinated surface-active substance can be applied to or incorporated in the porous material by rolls, a dipping bath, spray technology and further known methods. Perfluorinated surface-active substance can also be present in the electrolyte and washed into the porous material therewith. Due to the low surface tension of the surface-active substance a monolayer of the compound can already suffice. This has the advantage that even extremely small-pore fluoropolymer membranes can be sufficiently hydrophiled without the pore structure being sealed. After treatment with the perfluorinated surface-active substance the porous fluoropolymer is preferably coated at least partly on the inner surface. However it is also within the scope of the invention to produce by the treatment an at least partial coating on both the inner and outer surfaces. The inner and outer surfaces of the porous fluoropolymer are preferably covered completely with the perfluorinated surface-active substance. Initial porosity of the fluoropolymer and mean pore size are maintained.

Perfluorinated surface-active substances used in the sense of this invention are in particular components which manifest a high state of order of the hydrophilic groups on the surface of the porous material and give the latter a hydrophilic property.

Preferred perfluorinated surface-active substances to be used in the sense of the invention are ionic fluorosurfactants such as perfluorinated carboxylic acids or perfluorinated sulfonic acids, whereby the salts thereof can also be used. Perfluoropolyether with at least one terminal carboxylic acid group or the salt thereof can e.g. be used as a perfluorinated carboxylic acid or salt thereof. Furthermore one can use amphoteric fluorosurfactants such as perfluorinated betaines or sulfobetaines. It is also conceivable to use a combination of a perfluorinated cationic resin with a perfluorinated anionic surfactant.

The perfluorinated part of the molecule can, depending on the production method, be a) straight-chain, unbranched; b) terminal, branched; c) straight-chain with side groups; or d) highway branched. A chain length of the perfluorinated molecule part of four or more carbon atoms is generally preferred. These fluorosurfactants have high thermal and chemical stability which allows them to be used in aggressive media such as strong acids or bases, oxidizing or reducing solutions or at high temperatures. The nature of the polar molecule group of the surfactants furthermore influences the surface-active properties of the fluorosurfactant. Fluorosurfactants are generally preferred in the sense of the present invention which reduce the surface tension of the electrolytic solution to values of <28 mN/m. This presupposes a certain solubility of fluorosurfactant in the electrolyte.

The fluorinated surface-active substance is preferably mixed with a solvent before being applied to the porous material. Water is preferred as a solvent according to the invention. However, other solvents are also possible such as alcohols alone or in combination with water.

The solvent is removed after treatment of the porous material e.g. by guiding the carrier material over heated rollers or by means of forced-air ovens. Treatment of the porous material with a perfluorinated surface-active substance results in a permanent modification with minimal application of the perfluorinated surface-active substance. The latter is preferably applied to the porous material in monolayers or in limited fashion in multilayers. Especially permanent hydrophilic effects can be achieved depending on the selected modification variant. An oleophobic modification may be used for ePTFE membranes in a thin film as described in EP 587,988 B1. In such modification, the film is formed with equalized charge from at least one layer of a water soluble polycation and/or cationic synthetic resin, and a long chain surfactant or a alkyl-substituted polyanion. The polycation is adsorbed on the substrate and complexed with the long chain surfactant or the alkyl substituted polyanion. The surfactant is an aliphatic unbranched long-chain fluorosurfactant.

The perfluorinated surface-active substance is held on the porous material by physical or electrostatic adsorption. This ensures excellent adhesion of the substance to the porous material, thereby e.g. preventing the substance from being washed out and thus ensuring long life of the storage means.

The water- or alcohol-soluble perfluorinated surface-active substance preferably covers the total surface of the porous material. The thus treated porous material contains enough free and readily accessible reactive groups which are in a position to make the porous material wettable with an electrolyte. Furthermore a sufficient solubility of the perfluorinated surface-active substance in the electrolyte is given so that the surface tension of the electrolyte can be sufficiently reduced. The result of modification of the porous material is a changed more hydrophilic surface with an increased share of ionogenic groups in comparison to the starting material. The coating is therefore done using an excess of perfluorinated surface-active substance, part of the functional groups being used to manifest the hydrophilic property and the rest serving to reduce the surface tension of the electrolyte.

The electrolyte used can be an aqueous salt solution, aqueous solution of inorganic or organic acids and bases. One can also use gels e.g. from acids or bases in combination with inorganic oxides or salts such as aluminum oxide, zirconium dioxide, silicon dioxide, titanium dioxide, zinc oxide and iron oxide as well as metal oxides with coatings (oxides, organic substances), mixed oxides, ferrites, metallic salts such as sulfates, sulfites, sulfides and phosphates. One can also use polyfunctional organic compounds such as ionomers, polyelectrolytes or polyelectrolyte complexes. Organic electrolytes including a solvent and a salt may also be used. Typical solvents are propionitrile, diethylether, dimethylsulfoxide, tetrahydrofuran, 1,2 dimethoxytheane, ethylene carbonate, propylene carbonate dimethyl carbonate, ethyl methyl carbonate, diethyl carbonate, acetonitrile, methyl formate and dimethoxyethane and mixtures and combinations thereof. Typical salts are cations of tetraethyl ammonium, other tetraalkyl ammonium or ethyl methyl imidazolium or anions of trifluoromethyl sulfonimide, tetrafluoroborate, hexafluorophosphate, hexafluoroaresenate, trifluoromethane sulfonate and perchlorate.

The redox systems used in the inventive energy storage means can be e.g. redox systems of ruthenium, manganese or chromium.

The electrodes of the inventive energy storage means can be present in the form of plates or foils. It is also within the scope of the invention, however, to design the electrodes in other forms, such as stick electrodes.

The invention will be explained more closely in the following with reference to examples. The physical quantities were determined as follows.

Porosity

This was calculated by the following equation:

$$\text{Porosity} = (1 - \rho_m/\rho_t) \times 100\%$$

where $\rho_m$ is the measured density of the material and $\rho_t$ the theoretical density thereof.

Mean Pore Size (Mean Flow Pore Size, MFP)

A piece of membrane-with a 25 mm diameter was wetted with a perfluoropolyether (Porofil). The wetted membrane was placed in a Coulter porometer II (Coulter Electronics Ltd.) and the mean pore size ascertained.

Surface Tension

Surface tension was measured with the processor tensiometer K 12 from KRUSS-GmbH Hamburg using Wilhelmy's plate method. A plate of exactly known geometry was brought in contact with the liquid. The force with which the liquid moves along the wetting line on the plate was measured. This force is directly proportional to surface tension of the liquid.

Conductivity

Conductivity measurements were performed on the microprocessor precision conductometer LF 539 from Wissenschaftlich-Technische Werkstatten GmbH. The standard conductivity measuring cell TetraCon 96 was used.

EXAMPLE I

A 65 micron thick membrane of expanded polytetrafluoroethylene (mean pore diameter 0.40 microns, porosity 78%, GORE-TEX® membrane, obtained from W. L. GORE & Associates GmbH) was coated via a roll coater with a fluorosurfactant solution (7% FT 248 solution from isopropyl alcohol and water 1:1). The fluorosurfactant is available from Bayer AG and is $C_8F_{17}SO_2ONH_4$. The membrane was guided through a heated furnace (200° C.) and freed from the solvents. After coating, one obtained a membrane with a mean pore size of 0.41 microns. The coating weight was about 3 g/m², the porosity was unchanged. Six n sulfuric acid wetted the membrane immediately.

EXAMPLE 2

The surface tension values of fluorosurfactants were measured in water and sulfuric acid.

in accordance with Example 1 further membranes were furnished with fluorosurfactants. The results are stated in Table 1. All furnished membranes are wettable by electrolyte (e.g. 33% sulfuric acid).

TABLE 1

| Surfactant | Concentration | Surface tension of 6n sulfuric acid mN/m | Surface tension of water mN/m | Mean pore diameter of membrane μm |
|---|---|---|---|---|
| FT 800 (Bayer AG,, potassium salt of perfluoroctane sulfonic acid) | 1 | 17.0 | 24.6 | 0.40 |
| FT 248 (Bayer AG) | 1 | 16.5 | 18.4 | 0.37 |
| Hoe T 4260 (Hoechst Ag, sulfobetaine) | 1 | 19.8 | 18.6 | 0.38 |
| MF 201 (Ausimont, monodiphosphate of a perfluoropolyether) | 1 | 16.7 | 16.8 | 0.40 |

The surfactants FT 800 and MF 201 are insufficiently soluble in pure sulfuric acid or water. For measuring surface tension the stated concentration of surfactant was produced in water/isopropyl alcohol or sulfuric acid/isopropyl alcohol.

EXAMPLE 3

The membranes produced in Example 2 were installed in a capacitor (see FIG. 1). The electrolyte was 33% sulfuric acid. Temperature dependence of ionic conductivity of the electrolyte bound in the membrane was measured. Additionally, surface tension was measured in the new state and after five months of use in the capacitor. As the results show, no decrease in performance occurred at high temperatures or in long-term use.

TABLE 2

| Membrane modification | Surface tension of 6n sulfuric acid in new state mN/m | Surface tension of 6n sulfuric acid after 5 months mN/m | Conductivity 15° C. mS | Conductivity 50° C. Ms |
|---|---|---|---|---|
| FT 800 | 16.7 | 16.8 | 673 | 1092 |
| FT 248 | 17.7 | 17.3 | 665 | 1087 |
| Hoe T 4260 | 20.1 | 18.9 | | |
| 33.6% Sulfuric acid | 75.3 (Reference) | 75.3 (Reference) | 670 | 1092 |

The inventive energy storage means is preferably a double-layer capacitor. The carrier material also receives the electrolyte and holds it well with this capacitor. Due to the perfluorinated surface-active substance the electrodes are wetted well with the electrolyte and the total available surface activated.

Finally the inventive storage means can also advantageously be a battery.

In the widest sense the inventive carrier material can be used as an electrolytic storage means, separator or diaphragm in particular in electrochemical systems such as electrolysis or electrodialysis applications.

The invention claimed is:

1. An electrochemical energy storage device comprising at least two electrodes, a first electrolyte, and a carrier material for said first electrolyte disposed between the electrodes, wherein said carrier material is a porous material having an inner pore structure defining pores with inner surfaces, wherein a second perfluorinated surface-active substance different from said first electrolyte "is present on the inner surfaces of said pores solely in the form of a layer at least partially covering the inner surfaces of said pores, wherein said second substance does not fill said pores, wherein said first electrolyte is contained in said pores with the layer of the second substance being present on the inner surfaces", and wherein said inner pore structure consists essentially of a series of nodes interconnected by fibrils, said nodes generally aligned in parallel, being highly elongated and having an aspect ratio of 25:1 or greater.

* * * * *

UNITED STATES PATENT AND TRADEMARK OFFICE
CERTIFICATE OF CORRECTION

| | | |
|---|---|---|
| PATENT NO. | : 7,670,720 B1 | Page 1 of 1 |
| APPLICATION NO. | : 09/509232 | |
| DATED | : March 2, 2010 | |
| INVENTOR(S) | : Wolfgang Buerger et al. | |

It is certified that error appears in the above-identified patent and that said Letters Patent is hereby corrected as shown below:

Title Page, Item (57) Abstract should read

-- An electrochemical energy storage means with at least two electrodes and an electrolyte, a carrier material for the electrolyte being disposed between the electrodes, and the carrier material including a porous material in whose inner pore structure a perfluorinated surface-active substance is present. --.

Signed and Sealed this

Thirteenth Day of April, 2010

David J. Kappos
*Director of the United States Patent and Trademark Office*